(12) United States Patent
Nielsen et al.

(10) Patent No.: US 12,290,996 B2
(45) Date of Patent: May 6, 2025

(54) METHOD OF MANUFACTURING A WIND TURBINE BLADE

(71) Applicant: LM WIND POWER INTERNATIONAL TECHNOLOGY II APS, Kolding (DK)

(72) Inventors: Lars Nielsen, Kolding (DK); Klavs Jespersen, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 171 days.

(21) Appl. No.: 18/100,146

(22) Filed: Jan. 23, 2023

(65) Prior Publication Data
US 2023/0166464 A1      Jun. 1, 2023

Related U.S. Application Data

(62) Division of application No. 17/051,893, filed as application No. PCT/EP2019/061028 on Apr. 30, 2019, now Pat. No. 11,590,718.

(30) Foreign Application Priority Data

May 3, 2018    (EP) .................................... 18170532

(51) Int. Cl.
| B29C 70/68 | (2006.01) |
| B29C 70/30 | (2006.01) |
| B29D 99/00 | (2010.01) |
| B29K 67/00 | (2006.01) |
| B29L 31/08 | (2006.01) |

(Continued)

(52) U.S. Cl.
CPC ............ B29C 70/682 (2013.01); B29C 70/30 (2013.01); B29C 70/68 (2013.01); B29C 70/683 (2013.01); B29D 99/0028 (2013.01); *B32B 1/00* (2013.01); *B32B 3/02* (2013.01); *B32B 3/263* (2013.01); *B32B 5/022* (2013.01); *B32B 5/142* (2013.01); *B29K 2067/06* (2013.01); *B29L 2031/085* (2013.01)

(58) Field of Classification Search
CPC ..... B29C 35/0266; B29C 70/30; B29C 70/68; B29C 70/682; B29C 70/683; B29C 70/88; B29D 99/0028; B29K 2067/06; B29L 2031/085; B32B 1/00; B32B 3/02; B32B 3/263; B32B 5/022; B32B 5/142; Y02E 10/72; Y02P 70/50
USPC ...... 156/60, 228, 242, 245, 293, 294, 307.1; 416/223 R, 226, 229 R, 230, 241 R, 416/241 A, 232, 132 B; 264/258
See application file for complete search history.

(56) References Cited

U.S. PATENT DOCUMENTS

2008/0181781 A1     7/2008  Livingston et al.

FOREIGN PATENT DOCUMENTS

| EP | 1428650 A1 | 6/2004 |
| EP | 2338668 A1 | 6/2011 |
| WO | 2016206697 A1 | 12/2016 |

*Primary Examiner* — Philip C Tucker
*Assistant Examiner* — Brian R Slawski
(74) *Attorney, Agent, or Firm* — Nath, Goldberg & Meyer; Tanya E. Harkins

(57) ABSTRACT

The present invention relates to a method of manufacturing a wind turbine blade, comprising arranging one or more layers of fibre material and a preform in a mould (66), injecting the one or more layers of fibre material and the preform (76) with a curable resin, and curing the resin. The preform (76) is impregnated with a curing promoter such that the concentration of curing promoter varies spatially within the preform.

15 Claims, 4 Drawing Sheets

Figure 1:
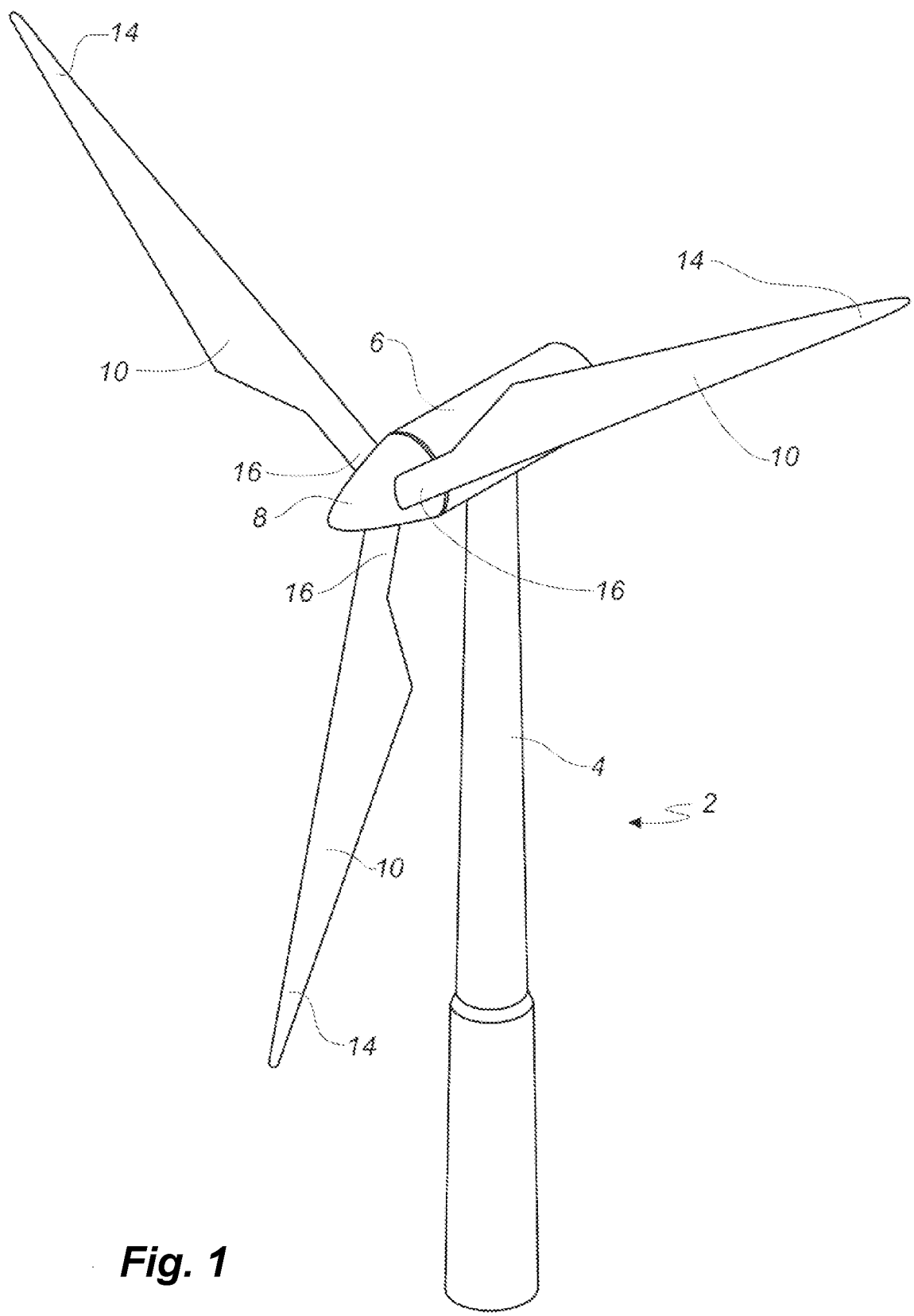

(51) Int. Cl.
*B32B 1/00* (2024.01)
*B32B 3/02* (2006.01)
*B32B 3/26* (2006.01)
*B32B 5/02* (2006.01)
*B32B 5/14* (2006.01)

METHOD OF MANUFACTURING A WIND TURBINE BLADE

CROSS-REFERENCE TO RELATED APPLICATIONS

This application is a divisional of U.S. patent application Ser. No. 17/051,893, filed on Oct. 30, 2020, which is a National Phase Application filed under 35 U.S.C. § 371 as a national stage of PCT Application No. PCT/EP2019/061028, filed on Apr. 30, 2019, which claimed the benefit of European Application No. 18170532.8, filed on May 3, 2018, the content of each of which is hereby incorporated by reference in its entirety.

FIELD OF THE INVENTION

The present invention relates to a method of manufacturing a wind turbine blade, to a preform of an elongate reinforcing element for a wind turbine blade and to a wind turbine blade obtainable by the method of the present invention.

BACKGROUND OF THE INVENTION

The rotor blades of modern wind turbines capture kinetic wind energy by using sophisticated blade design created to maximise efficiency. There is an increasing demand for large wind blades which may exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using blade moulds. First, a blade gel coat or primer is applied to the mould. Subsequently, fibre reinforcement and/or fabrics are placed into the mould followed by resin infusion. The resulting shell halves are assembled by being glued or bolted together substantially along a chord plane of the blade.

Vacuum infusion or VARTM (vacuum assisted resin transfer moulding) is one method, which is typically employed for manufacturing composite structures, such as wind turbine blades comprising a fibre-reinforced matrix material. During the manufacturing process, liquid polymer, also called resin, is filled into a mould cavity, in which fibre material has been arranged, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibres arranged in mats, felt mats made of individual fibres or unidirectional or woven mats, i.e. multi-directional mats made of fibre rovings, etc. A second mould part, which is often made of a resilient vacuum bag, is subsequently placed on top of the fibre material and sealed against the first mould part in order to generate a mould cavity. By generating a vacuum, typically 80 to 95% of the total vacuum, in the mould cavity between the first mould part and the vacuum bag, the liquid polymer can be drawn in and fill the mould cavity with the fibre material contained herein.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

In the above-described manufacturing process, preforms may be used. A preform is a shaped arrangement of fibres, such as one or multiple layers thereof, which has been bound and/or consolidated for later use as part of the fibre lay-up in the blade mould. The rationale for using preforms for blade manufacturing is to reduce cycle time in the blade mould. Also, using preforms may reduce the number of required repairs due to the pre-consolidated structure of the preforms.

Preforms may be used for producing blade parts such as a reinforcing elements, such as main laminates or spar cap, for forming a load-bearing structure of a wind turbine blade. However, when producing large blades, the main laminate gets proportionally larger, also in terms of its overall volume. Since such parts usually have a comparatively low thickness towards their edges this may lead to problems during curing. In particular, this may lead to undesired differences in curing temperatures within the main laminate. Thinner parts of the element may not receive significant exotherm heat, thus not heating up as much as thicker, central parts of the reinforcing element. This may lead to manufacturing defects within the part as the degree and timing of shrinkage during the curing process may vary spatially, i.e. the degree and timing of shrinkage in the thicker parts may be different from the degree and timing of shrinkage in the edge portions.

It is thus a first object of the present invention to provide a method of manufacturing a wind turbine blade or parts thereof resulting in less manufacturing defects, in particular of reinforcing blade elements.

It is a further object of the present invention to provide a method of manufacturing a wind turbine blade which is cost-effective and flexible.

It is another object of the present invention to provide a method of resin-infusing and curing of a wind turbine blade part which results in less thermal stress and related deformations in the finished part.

SUMMARY OF THE INVENTION

The present inventors have found that one or more of said objects may be achieved by a method of manufacturing a wind turbine blade, the blade having a profiled contour including a pressure side and a suction side, and a leading edge and a trailing edge with a chord having a chord length extending therebetween, the wind turbine blade extending in a spanwise direction between a root end and a tip end, said method comprising:
  providing a mould,
  arranging one or more layers of fibre material in the mould for providing a skin element,
  arranging a preform on at least part of the one or more layers of fibre material for providing a reinforcing element,
  injecting the one or more layers of fibre material and the preform with a curable resin, and
  curing the resin,
wherein the preform is impregnated with a curing promoter such that the concentration of curing promoter varies spatially within the preform.

The present inventors have found that the use of such preforms enable the production of comparatively large reinforcing elements, such as main laminates, with few to no manufacturing defects. It was also found that this approach results in a reduced cycle time for curing. The curing promoter may advantageously accelerate the curing process locally towards the edges of the preform. The present inventors have found this to yield a surprisingly even and balanced curing profile leading to less manufacturing defects caused by an uneven/irregular curing process. In some embodiments, the preform may be impregnated with the curing promoter along both its lateral edges within longitudinally extending strips of 5-200 mm width, such as 10-100 mm width, adjacent to either of its lateral edges, preferably such that the remainder of the preform is not impregnated with the curing promoter.

The mould may comprise a moulding surface corresponding substantially to the outer surface of a wind turbine blade shell half. Typically, the step of arranging one or more layers of fibre material in the mould for providing a skin element includes laying several layers of fibre material successively onto the moulding surface of the mould. The fibre material may comprise glass fibres, carbon fibres or a combination thereof. According to a preferred embodiment of the method, a glass fibre material is placed into the mould, such as multiple layers of glass fibre material, for providing a skin element. The fibre material may optionally be brought into contact with a binding agent before or during the fibre lay-up. The fibre lay-up process may involve aligning a plurality of fibres, or fibre layers, substantially unidirectionally. In one embodiment, the fibre material may include fibre rovings, such as glass fibre rovings. The lay-up process may include placing multiple single roving bundles into the mould, the roving bundles being preferably aligned unidirectionally.

The preform is then arranged on at least part of the one or more layers of fibre material for providing a reinforcing element. In some embodiments, the skin element may comprise a recess for receiving the preform of a reinforcing element. Typically, the preform will comprise at least one fibre material, such as a glass fibre material. In a preferred embodiment, the preform comprises at least one fibre layer and/or fibre fabric, such as two or more fibre layers and/or fibre fabrics. Preferably, the preform comprises strands of parallel fibres, such as glass fibres and/or carbon fibres. In some embodiments, two or more of the preforms according to the present invention are arranged in the mould.

Next, the one or more layers of fibre material and the preform are injected with a curable resin. The resin used according to the present invention is preferably a thermosetting resin. Examples of suitable thermosetting resins include ester-based resins, such as unsaturated polyester resins, vinyl ester resins and urethane (meth)acrylates. Typically, the resin infusion step comprises vacuum assisted resin transfer moulding. The resin may be an epoxy, a polyester, a vinyl ester or another suitable thermoplastic or duroplastic material, preferably a vinyl ester. In other embodiments, the resin may be a thermosetting resin, such as epoxy, vinyl ester or polyester, or a thermoplastic resin, such as nylon, PVC, ABS, polypropylene or polyethylene.

The resin is then cured, preferably with no external heating. Advantageously, redox systems are used for resin curing. Such redox systems may comprise an oxidizing agent, such as a peroxide and a soluble transition metal ion as curing accelerator. The curing accelerator preferably increases the activity of the oxidizing agent at lower temperatures, such as at ambient temperatures, thus enhancing the curing rate.

The preform of the reinforcing element is impregnated with a curing promoter such that the concentration of curing promoter varies spatially within the preform. Thus, in embodiments in which the preform comprises a fibre material, the fibre material of the preform is impregnated with the curing promoter such that the concentration of curing promoter varies spatially within the fibre material of the preform.

Preferably, the preform is an elongate preform. In a preferred embodiment, the preform is impregnated with the curing promoter prior to layup in the mould. For instance, an elongate preform may be wound up on a roll or spindle prior to layup, wherein the two opposing outer edges of the wound-up preform could be contacted with the curing promoter. In other embodiments, the reform is impregnated with a curing promotor of layup in the mould.

The method may also comprise the steps of curing the resin to form an upwind blade half and/or a downwind blade half, and joining an upwind blade half and a downwind blade half to form a wind turbine blade.

In a preferred embodiment, the preform has a cross section with a central portion and two opposing outer edges, wherein the thickness of the preform decreases from the central portion towards each of the two outer edges, and wherein the preform is impregnated with the curing promoter such that the concentration of curing promoter decreases from one or both outer edges towards the central portion of the preform. The preform may have a length, i.e. a longitudinal extension, a width and a thickness or height. Typically, its width and thickness are less than its length. For example, the width could be 0.5-1.5 m, the thickness could be 1-100 mm and the length could be 10 m or more. The length or longitudinal extension of the preform and of the resulting reinforcing element, such as a main laminate, will usually coincide with the spanwise direction of the wind turbine blade. A cross section of the preform will usually extend between a left outer edge and a right outer edge, the distance between said left and right outer edges defining the width of the preform at that cross section. A central portion of such cross section may correspond to a midpoint of the distance between said left and right outer edges, or to a portion or interval including such midpoint. For example, the central portion may extend at least 50 mm, such as at least 100 mm, or at least 200 mm, from the midpoint towards each of the opposing outer edges in the width direction of the preform. The decrease in concentration of curing promoter from one or both outer edges towards the central portion of the preform may be an abrupt decrease from a given concentration to zero. In other, embodiments it may be a continuous or smooth decrease.

In a preferred embodiment, the preform has two edge regions, each edge region extending laterally within a distance of 100 mm or less from the respective outer edge towards the central portion of the preform, wherein the preform is impregnated with the curing promoter within one or both edge regions. Said edge regions preferably extend over the entire length of the preform. It is preferred that the preform is impregnated with the curing promoter within both edge regions, advantageously over the entire length of the preform. In some embodiments, the concentration of the curing promoter is constant within both edge regions. Preferably, the concentration of the curing promoter is substantially constant within the entire volume of the respective edge region or strip. In other embodiments, the concentration of the curing promoter, such as a curing accelerator, is zero in the central portion of the preform.

The two edge regions will typically be opposing edge regions, such as a left edge region and a right edge region, as seen in a cross section of the preform. Each edge region may extend laterally within a distance of 10 mm or less, 20 mm or less, 30 mm or less, 40 mm or less, 50 mm or less, 60 mm or less, 70 mm or less, 80 mm or less, or 90 mm or less, from the respective outer edge towards the central portion or midpoint of the preform, as seen in a cross section of the preform, preferably over the entire length of the preform. As used herein, extending laterally means an extension in the horizontal (width) direction H of the preform, as illustrated e.g. in FIG. 7.

Usually, the central portion of the preform includes the midpoint of the preform on a line connecting a left and a right outer edge as seen in a cross section of the preform. In some embodiments, the central portion extends along the entire width of the preform except for the two edge regions.

According to another embodiment, the preform is not impregnated with the curing promoter outside of said edge regions. In other embodiments, the concentration of the curing promoter is lower outside said edge regions than within said edge regions. In some embodiments, the concentration of the curing promoter is non-zero outside said edge regions.

In a preferred embodiment, the preform is impregnated with the curing promoter prior to the step of arranging the preform on at least part of the one or more layers of fibre material. Part of the fibre material of the preform may be contacted with the curing promoter to achieve impregnation, the impregnated material may then be dried and stored for further use.

In some embodiments, the curing promoter is a curing accelerator comprising a metal. The curing accelerator of the present invention may comprise one or more salts of metals such as lithium, calcium, copper, vanadium, zirconium, titanium, zinc, iron, sodium, potassium, magnesium, manganese, barium and cobalt, optionally in combination with one or more compounds of alkyl organic acids, halides, nitrates to form a coordination compound. A preferred curing accelerator according to the present invention may comprise a transition metal salt or complex. In a preferred embodiment, the transition metal is cobalt. In some embodiments, the curing accelerator may be pre-mixed to form a metal salt complex prior to contacting the preform with the curing accelerator. In other embodiments, individual components of the curing accelerator may be contacted with the preform separately to form the metal complex in situ. In a preferred embodiment, the curing promoter is a curing accelerator comprising a transition metal such as cobalt, manganese, iron or copper. In other embodiments, the curing accelerator comprises one or more organic cobalt salts and/or one or more amines, such as tertiary amines.

In some embodiments, the curing accelerator may be added to the preform before adding a curing initiator such as a peroxide. In other embodiments, the preform may be impregnated with the curing accelerator only, prior to infusing the resin in the fibre parts. In some embodiments, the preform may be contacted with a solution containing the curing accelerator to impregnate the preform with the same.

In other embodiments, the curing promoter is a curing initiator such as a peroxide, preferably an organic peroxide. In some embodiments, the curing promotor is a combination of a curing initiator such as a peroxide, preferably an organic peroxide, and a curing accelerator, such as one or more organic cobalt salts and/or one or more tertiary amines.

In a preferred embodiment, the resin comprises a polyester, such as an unsaturated polyester. An unsaturated polyester resin may be cured by free radicals which are formed when organic peroxides decompose. The decomposition initiates a reaction by which unsaturated polyester molecules polymerize with styrene forming a three-dimensional structure. Organic peroxides may decompose into free radicals by exposure to heat or in combination with one or more curing accelerators.

According to another embodiment, the curing of the resin is performed without external heating. Thus, the curing may be a cold curing, activated by a curing accelerator, such as an amine and/or a cobalt-containing compound. Useful curing systems include are methylethylketone, cyclohexanone or acetylacetone peroxides in combination with a cobalt-containing compound such as organic cobalt salts, and dibenzoyl peroxide in combination with one or more tertiary amines.

In a preferred embodiment, the reinforcing element is a load-carrying main laminate or spar cap of the wind turbine blade for supporting one or more shear webs. The main laminate is typically formed as a fibre insertion which comprises a plurality of fibre reinforcement layers, e.g. between 20 and 50 layers. However, the preforms could also be used for other parts and regions of a wind turbine blade, such as reinforced parts of the leading edge and/or the trailing edge of the blade.

In another aspect, the present invention relates to a preform of an elongate reinforcing element for a wind turbine blade, the preform comprising a fibre material, wherein the preform is impregnated with a curing promoter such that the concentration of curing promoter varies spatially within the preform. In a preferred embodiment, the preform comprises at least one fibre layer or fibre fabric. Preferably, the preform comprises strands of parallel fibres, such as glass fibres and/or carbon fibres.

According to another embodiment, the preform has a cross section with a central portion and two opposing outer edges, wherein the thickness of the preform decreases from the central portion towards each of the two outer edges, and wherein the preform is impregnated with the curing promoter such that the concentration of curing promoter decreases from one or both outer edges towards the central portion of the preform.

In a preferred embodiment, the preform has two edge regions, each edge region extending laterally within a distance of 100 mm or less from the respective outer edge towards the central portion of the preform, wherein the preform is impregnated with the curing promoter within one or both edge regions. As described above, each edge region may extend laterally within a distance of 10 mm or less, 20 mm or less, 30 mm or less, 40 mm or less, 50 mm or less, 60 mm or less, 70 mm or less, 80 mm or less, or 90 mm or less, from the respective outer edge towards the central portion or midpoint of the preform, as seen in a cross section of the preform.

According to another embodiment, the preform is not impregnated with the curing promoter outside of said edge regions. In some embodiments, the preform is not impregnated with the curing accelerator, as described herein, outside of said edge regions.

In a preferred embodiment, the curing promoter is present in the edge region in a concentration of 0.01 to 10 parts, such as 0.01 to 1 parts, or 0.1 to 1 parts, by weight of curing promoter relative to the weight of the fibre material. In other embodiments, the curing promoter, preferably the curing accelerator, is present outside of the edge regions in a concentration of 0 to 0.1, such as 0 to 0.01 parts by weight of the fibre material. Preferably, the concentration of curing promoter, preferably curing accelerator, is at least five times, at least ten times or at least 25-times higher within the edge regions as compared to outside the edge regions. In some embodiments, the curing promoter is present within parts of the preform, such as the edge regions, in an amount of 0.01-15 wt %, such as 0.1-15 wt % or 0.1-5 wt %, relative to the weight of the fibre material.

According to another embodiment, the curing promoter is a curing accelerator comprising a transition metal such as cobalt, manganese, iron or copper. In a preferred embodiment, the curing promoter is a curing initiator such as a peroxide, preferably an organic peroxide. Preferably, the curing initiator is methyl ethyl ketone peroxide.

The preform of the present invention may further comprise a binding agent which is added to the fibre material for an improved handling. Such binding agent is preferably present in an amount of 0.1-15 wt % relative to the weight of the fibre material. The binding agent may also be present in an amount of 5-40, preferably 10-20, gram per square meter of glass surface. In some embodiments, the binding agent is a thermoplastic binding agent. The binding agent may comprise a polyester, preferably a bisphenolic polyester.

In one embodiment of the present invention, the preform has a length of between 5 and 100 meters. In some embodiments, the preform has a length of at least 5, 10, 20 or 50 meters.

In another aspect, the present invention relates to a wind turbine blade obtainable by the above-described method. Such wind turbine blade was found to be more resilient and to exhibit less manufacturing defects resulting from thermal stress created in the curing process of the reinforcing element.

It will be understood that any of the above-described features may be combined in any embodiment of the inventive method or preform. In particular, features and embodiments described with regard to the preform may also apply to the method of manufacturing, and vice versa.

As used herein, the term "longitudinal" means the axis running substantially parallel to the maximum linear dimension of the preform, the reinforcing element or the blade.

As used herein, the term "substantially" usually means what is specified, but may deviate from the specified amount by 15% or less, 10% or less or 5% or less.

As used herein, the term "wt %" means weight percent. The term "relative to the weight of the fibre material" means a percentage that is calculated by dividing the weight of an agent, such as a curing promoter, by the weight of the fibre material. As an example, a value of 1 wt % relative to the weight of the fibre material corresponds to 10 g of curing promoter per kilogram of fibre material.

As used herein, the term "concentration" refers to a measure of an amount or weight of a substance, such as a curing promoter, contained per weight of dry material of the preform, such as the weight of fibre material, within a given region of the preform.

As used herein, the term "elongate" or "elongate preform" refer to a preform having two dimensions that are much less than a third dimension, such as at least three, five, ten or twenty times less than a third dimension. Typically, the third dimension will be the length (longitudinal extension) of the preform, as opposed to the two lesser dimensions, width and height (thickness). The length (longitudinal extension) of the preform will typically be in the spanwise direction of the wind turbine blade.

DETAILED DESCRIPTION OF THE INVENTION

Figure 2:
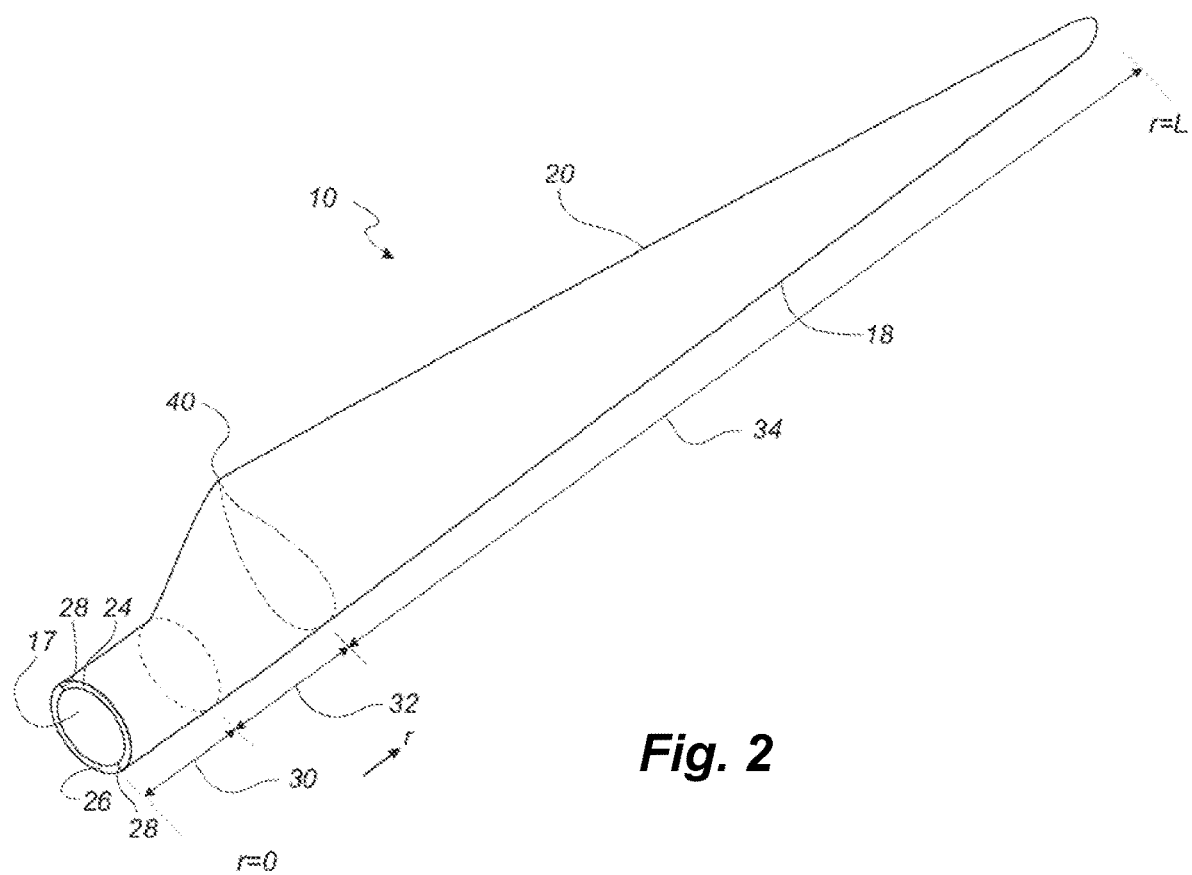
Figure 3:
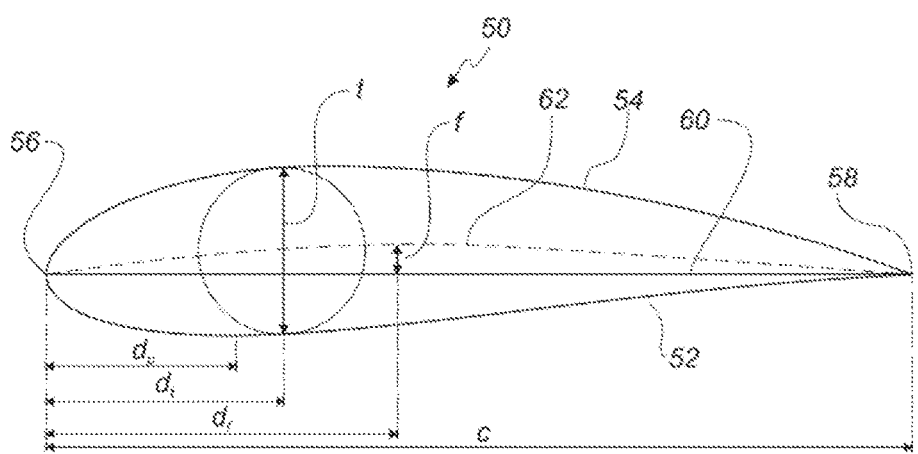
Figure 4:
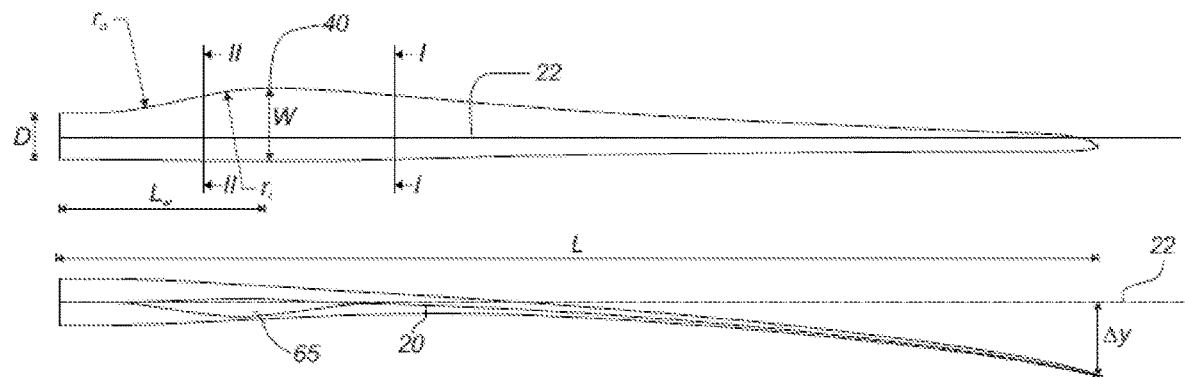
Figure 5:
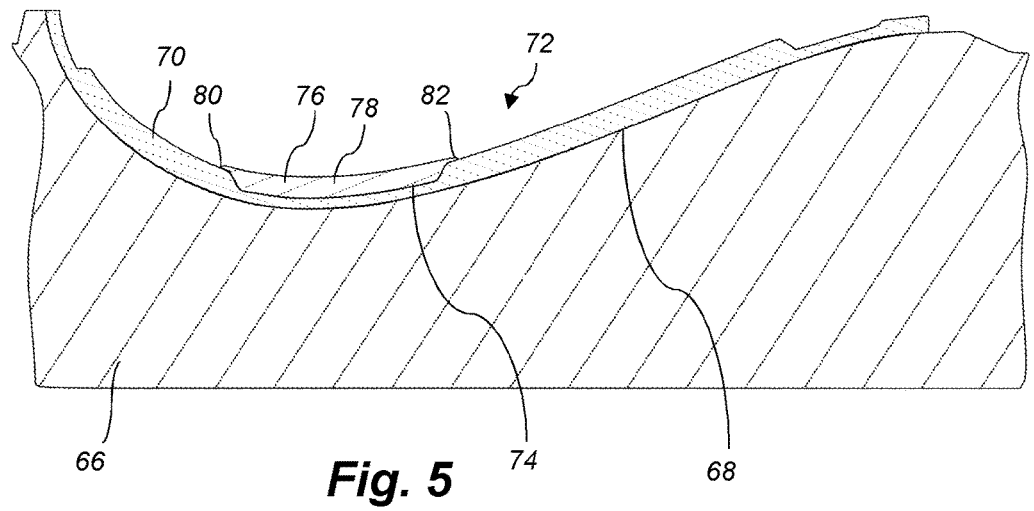
Figure 6:
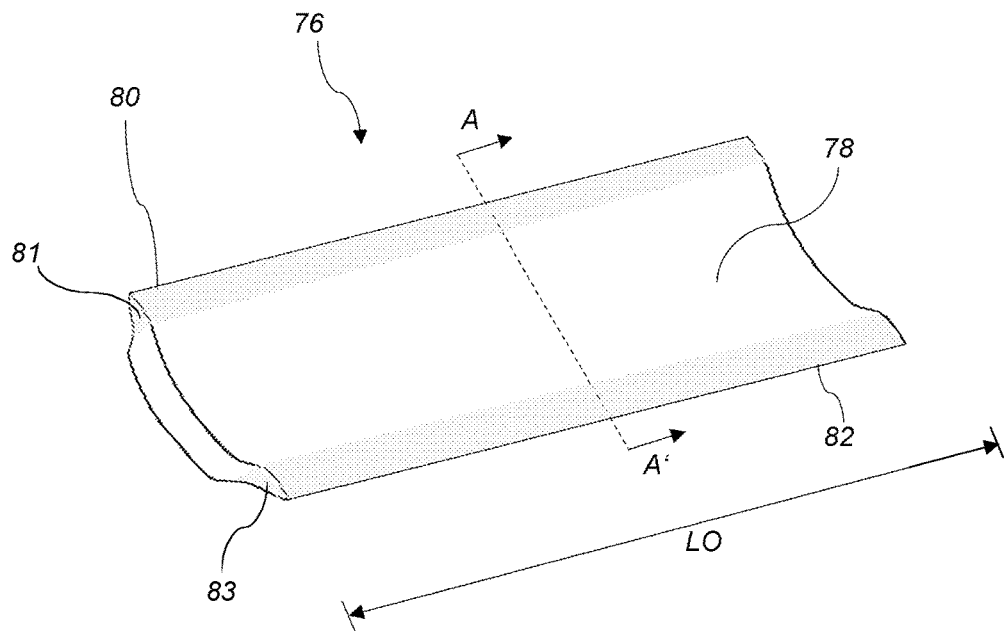
Figure 7:
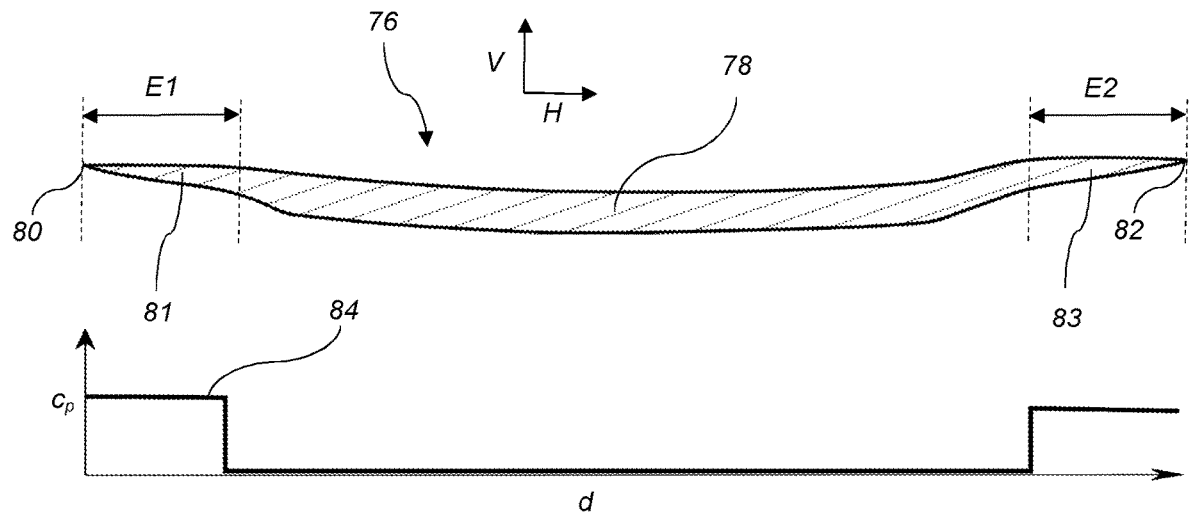

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a schematic cross-sectional view of a mould for moulding a blade part according to the present invention, FIG. 6 is a perspective view of a preform according to the present invention, and FIG. 7 shows a cross sectional view of the preform taken along the line A-A' in FIG. 6.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor-normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position dr of the maximum camber f, the maximum airfoil thickness t, which is the largest diameter of the inscribed circles along the median camber line 62, the position di of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 is a schematic cross-sectional view through a mould 66 for use in a method of manufacturing a wind turbine blade. The mould comprises a moulding surface 68, which defines an outer surface of the finished wind turbine blade, here shown as the pressure side of the blade.

A number of fibre layers, core parts and reinforcement sections are arranged on the moulding surface 68, these parts forming a skin element 70 of the aerodynamic shell part or pressure side shell part 72 of the wind turbine blade (details not shown). The aerodynamic shell part 72 may for instance be manufactured by first applying a waxy substance to the moulding surface in order to be able to remove the shell part after moulding. Also, a gelcoat may be applied to the moulding surface. The skin element may comprise a recess 74 for receiving a preform of a reinforcing element 76, such as a spar cap or main laminate. The preform of the reinforcing element 76 extends in a longitudinal direction of the blade and forms a load carrying structure of the finished blade after resin infusion and curing.

The preform 76 has a cross section with a central portion 78 and two opposing outer edges 80, 82. The thickness of the preform 76 decreases from the central portion 78 towards each of the two outer edges 80, 82. Preferably prior to arranging the preform 76 in the mould, it is impregnated with a curing promoter such that the concentration of curing promoter decreases from one or both outer edges 80, 82 towards the central portion 78 of the preform. The skin element 70 and the preform 76 are injected with a curable resin which is then cured to form the wind turbine blade part 72.

FIG. 6 is a perspective view of a preform 76 of the present invention, wherein FIG. 7 shows a cross-sectional view of the preform 76 taken along the line A-A' in FIG. 6, substantially perpendicular to the longitudinal direction LO indicated in FIG. 6. As indicated by the shaded areas in FIG. 6, the preform 76 is impregnated with the curing promoter along both its lateral edges 80, 82 within longitudinally extending strips or edge regions 81, 83 adjacent to the lateral edges 80, 82. Preferably, the remainder of the preform 76 is not impregnated with the curing promoter.

As best seen in FIG. 7, the preform 76 has a thicker central portion 78 and two edge regions 81, 83, each edge region extending laterally within a distance E1, E2 of, for example, 100 mm or less from the respective outer edge 80, 82 towards the central portion 78 of the preform 76. The lower part of FIG. 7 illustrates a concentration profile 84 across the preform 76 extending between both outer edges 80, 82, wherein the concentration $c_p$ of the curing promoter is plotted versus the horizontal distance d from outer edge 80. The vertical and horizontal dimensions V, H are also indicated in FIG. 7. As seen in the graph of FIG. 7, the preform 76 is impregnated with curing promoter within the edge regions 81, 83, while the preform 76 is not impregnated with the curing promoter outside of said edge regions 81, 83. While a concentration profile 84 is illustrated in FIG. 7, a smoother or more transient concentrations profile is also possible according to the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
66 mould
68 moulding surface
70 skin element
72 shell part
74 recess
76 preform of reinforcing element
78 central portion of preform 80 first outer edge
81 first edge region
82 second outer edge
83 second edge region
84 concentration profile
c chord length
$c_p$ concentration of curing promoter
d distance
$d_t$ position of maximum thickness
$d_f$ position of maximum camber
$d_p$ position of maximum pressure side camber
E1, E2 distances from outer edge
f camber
H horizontal direction
L blade length
LO longitudinal direction
r local radius, radial distance from blade root
t thickness
V vertical design
Δy prebend

The invention claimed is:

1. A method of manufacturing a wind turbine blade, the blade having a profiled contour including a pressure side and a suction side, and a leading edge and a trailing edge with a chord having a chord length extending therebetween, the wind turbine blade extending in a spanwise direction between a root end and a tip end, said method comprising:
providing a mould (66);
arranging one or more layers of fibre material in the mould for providing a skin element (70);
arranging a preform (76) on at least part of the one or more layers of fibre material for providing a reinforcing element;
injecting the one or more layers of fibre material and the preform (76) with a curable resin; and
curing the resin,
wherein the preform (76) is impregnated with a curing promoter such that the concentration of curing promoter varies spatially within the preform (76).

2. The method according to claim 1, wherein the preform (76) has a cross section with a central portion (78) and two opposing outer edges (80, 82), wherein the thickness of the preform (76) decreases from the central portion (78) towards each of the two outer edges (80, 82), and wherein the preform (76) is impregnated with the curing promoter such that the concentration of curing promoter decreases from one or both outer edges (80, 82) towards the central portion (78) of the preform (76).

3. The method according to claim 2, wherein the preform (76) has two edge regions (81, 83), each said edge region extending laterally within a distance of 100 mm or less from a respective one of the outer edges (80, 82) towards the central portion (78) of the preform (76), wherein the preform (76) is impregnated with the curing promoter within one or both edge regions (81, 83).

4. The method according to claim 3, wherein the preform (76) is not impregnated with the curing promoter outside of said edge regions (81, 83).

5. The method according to claim 1, wherein the preform (76) is impregnated with the curing promoter prior to the step of arranging the preform (76) on at least part of the one or more layers of fibre material.

6. The method according to claim 1, wherein the preform (76) comprises at least one fibre layer or fibre fabric.

7. The method according to claim 1, wherein the curing promoter is a curing accelerator comprising a transition metal.

8. The method according to claim 7, wherein the transition metal comprises cobalt, manganese, iron or copper.

9. The method according to claim 1, wherein the curing promoter is a curing initiator.

10. The method according to claim 9, wherein the curing initiator comprises a peroxide.

11. The method according to claim 10, wherein the peroxide comprises an organic peroxide.

12. The method according to claim 1, wherein the resin comprises a polyester.

13. The method according to claim 12, wherein the polyester comprises an unsaturated polyester.

14. The method according to claim 1, wherein the curing of the resin is performed without external heating.

15. The method according to claim 1, wherein the reinforcing element is a load-carrying main laminate or a spar cap of the wind turbine blade for supporting one or more shear webs.

* * * * *